(12) United States Patent
Ludwin et al.

(10) Patent No.: US 7,868,890 B2
(45) Date of Patent: Jan. 11, 2011

(54) DISPLAY PROCESSOR FOR A WIRELESS DEVICE

(75) Inventors: Albert Scott Ludwin, San Diego, CA (US); Scott Howard King, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 10/954,408

(22) Filed: Sep. 29, 2004

(65) Prior Publication Data

US 2005/0184993 A1　　Aug. 25, 2005

Related U.S. Application Data

(60) Provisional application No. 60/547,711, filed on Feb. 24, 2004, provisional application No. 60/569,288, filed on May 6, 2004.

(51) Int. Cl.
*G06F 15/16* (2006.01)
(52) U.S. Cl. .................. 345/502; 345/503; 345/519; 345/520
(58) Field of Classification Search ................ 345/502, 345/503, 519, 520
See application file for complete search history.

(56) References Cited

U.S. PATENT DOCUMENTS

| | | | | |
|---|---|---|---|---|
| 5,451,981 A | * | 9/1995 | Drako et al. ................ | 345/620 |
| 5,471,583 A | * | 11/1995 | Au et al. ..................... | 710/57 |
| 5,548,324 A | | 8/1996 | Downs et al. ................ | 348/15 |
| 5,640,543 A | | 6/1997 | Farrell et al. ................ | 395/502 |
| 5,808,630 A | * | 9/1998 | Pannell ....................... | 345/546 |
| 5,826,035 A | | 10/1998 | Hamada et al. ......... | 395/200.77 |
| 5,850,207 A | * | 12/1998 | Eglit .......................... | 345/671 |
| 5,923,385 A | * | 7/1999 | Mills et al. ................ | 348/715 |
| 5,966,116 A | * | 10/1999 | Wakeland ................ | 345/658 |

(Continued)

FOREIGN PATENT DOCUMENTS

EP　　0690430　　5/1995

(Continued)

OTHER PUBLICATIONS

Gharachorloo et al., A Characterization of Ten Rasterization Techniques, Jul. 1989, Computer Graphics, vol. 23, No. 3, pp. 355-368.*

(Continued)

*Primary Examiner*—Daniel Washburn
(74) *Attorney, Agent, or Firm*—Howard Seo; James R. Gambale, Jr.

(57) ABSTRACT

A display processor includes an interface unit, an instruction processor, a synchronization unit, at least one processing unit, and a device buffer. The interface unit receives input image data (e.g., from a main memory) and provides output image data for a frame buffer. The instruction processor receives instructions (e.g., in a script or list) and directs the operation of the processing unit(s). The synchronization unit determines the location of a read pointer for the frame buffer and controls the writing of output image data to the frame buffer to avoid causing visual artifacts on an LCD screen. The processing unit(s) may perform various post-processing functions such as region flip, region rotation, color conversion between two video formats (e.g., from YCrCb to RGB), up/down image size rescaling, alpha-blending, transparency, text overlay, and so on.

13 Claims, 8 Drawing Sheets

U.S. PATENT DOCUMENTS

| | | | | |
|---|---|---|---|---|
| 6,361,438 B1 * | 3/2002 | Morihira | ............... | 463/31 |
| 6,366,289 B1 * | 4/2002 | Johns | ............... | 345/543 |
| 6,600,840 B1 * | 7/2003 | McCrossin et al. | ............... | 382/302 |
| 6,707,516 B1 * | 3/2004 | Johnson et al. | ............... | 349/78 |
| 6,724,403 B1 * | 4/2004 | Santoro et al. | ............... | 715/765 |
| 6,795,062 B1 | 9/2004 | Boursier | | |
| 2002/0190943 A1 | 12/2002 | Kayada et al. | | |
| 2003/0189581 A1 * | 10/2003 | Nasoff et al. | ............... | 345/660 |
| 2005/0066205 A1 * | 3/2005 | Holmer | ............... | 713/320 |

FOREIGN PATENT DOCUMENTS

| | | |
|---|---|---|
| EP | 1253578 | 10/2002 |
| KR | 0148830 | 10/1998 |
| KR | 20030063515 | 7/2003 |

OTHER PUBLICATIONS

International Search Report—PCT/US05/006327, International Search Authority—European Patent Office—Sep. 20, 2005.

Written Opinion—PCT/US2005/006327, International Search Authority—European Patent Office—Sep. 20, 2005.

* cited by examiner

Chrominance Upsampling

Downscale by 1/2

☐ One pixel in input block
■ One pixel in output block

Downscale by 3/8

Downscale by 5/8

DISPLAY PROCESSOR FOR A WIRELESS DEVICE

This application claims the benefit of provisional U.S. Application Ser. No. 60/547,711, entitled DISPLAY PROCESSOR FOR A WIRELESS DEVICE filed Feb. 24, 2004 and provisional U.S. Application Ser. No. 60/569,288 entitled MOBILE DISPLAY PROCESS (MDP) HLD DOCUMENT filed on May 6, 2004.

BACKGROUND

I. Field

The present invention relates generally to circuits, and more specifically to a display processor.

II. Background

Wireless communication devices (e.g., cellular phones) are widely used to provide voice and data communication. These wireless devices are also designed to provide an increasing number of functions and applications as their computational power and memory size increase. For example, many wireless devices have capabilities to capture and process still images and/or moving videos, support video gaming, and so on.

Video and graphics applications generally require extensive processing power, which may be provided by digital signal processors (DSPs), micro-processors, and so on. These processors may perform all of the required processing on raw image data and provide output image data to a display screen for presentation to a user. These processors may also support other functions and applications. Each video/graphics task performed by the processors consumes certain amount of resources, which then reduces the amount of resources available for other functions and applications.

Video and graphics applications also typically require many memory accesses to fetch raw image data from an external memory and to write processed image data back to the external memory. The memory accesses may be performed via an external bus interface (EBI). During the time that the image data is being fetched or written back, the EBI is tied up and cannot be used by other processors and/or for other applications, which is highly undesirable.

The display sizes for wireless devices are relatively small with current state-of-the-art technology but are likely to increase as technology improves. As the display sizes grow and color depth increases, video and graphics applications will likely become more sophisticated, consume more processor resources, and require more memory accesses.

There is therefore a need in the art for techniques to efficiently support video and graphics applications in wireless devices, especially as display sizes and/or color depth increase.

SUMMARY

A display processor that can efficiently provide an interface between video and/or graphics processors and a frame buffer in a wireless device is described herein. The frame buffer stores image data for an electronic screen, e.g., a liquid crystal display (LCD) screen. The display processor can efficiently update image data in the frame buffer for the LCD screen. The display processor can perform post-processing on-the-fly on image data to be displayed on the LCD screen. This allows the video/graphics processors to perform other tasks and also avoids wasted processing on image data that is not displayed. The display processor also reduces the number of memory accesses to a main memory used to store the image data. The display processor can perform post processing, composing, transforming, and conversion of rectangular regions from multiple sources to a complex frame that is transferred to the LCD screen.

In an embodiment, the display processor includes an interface unit, an instruction processor, a synchronization unit, at least one processing unit, and a device buffer. The interface unit receives input image data (e.g., from the main memory) and provides output image data for the frame buffer. The instruction processor receives instructions (e.g., from a controller within the wireless device) and directs the operation of the processing unit(s). The instructions may be given in a list, and the instruction processor may execute the instructions in the list until a termination condition (e.g., a STOP command) is encountered. The synchronization unit determines the location of a read pointer for the frame buffer and controls the writing of output image data to the frame buffer to avoid causing visual artifacts on the LCD screen. The processing unit(s) may perform various post-processing functions such as region flip, region rotate, color conversion from one video format (e.g., YCrCb) to another video format (e.g., RGB), up/down image size resealing, alpha-blending, transparency, text overlay, and so on.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
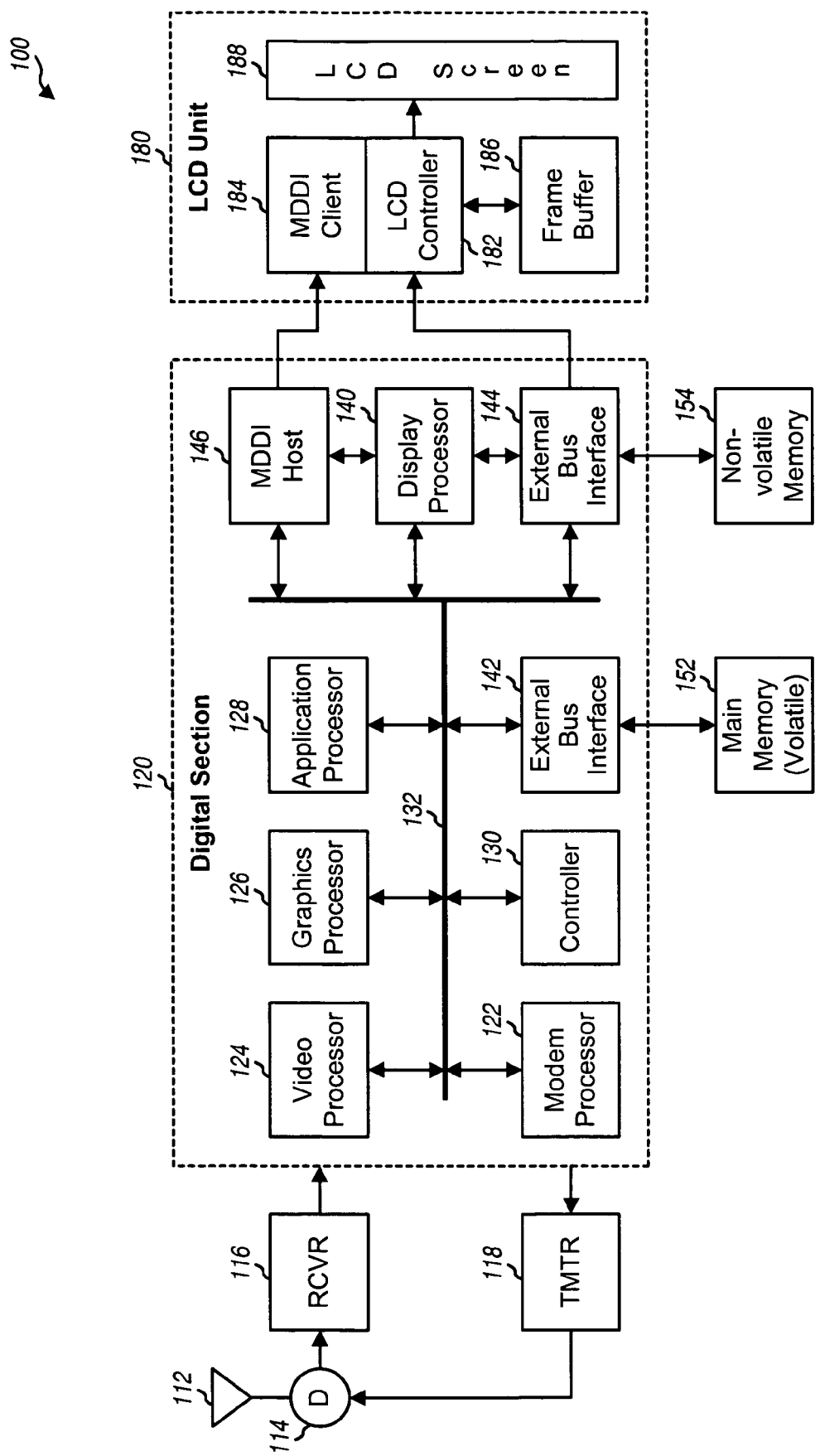
FIG. 1 shows a block diagram of a wireless device.

FIG. 1 shows a block diagram of a wireless device 100 in a wireless communication system. Wireless device 100 may be a cellular phone, a terminal, a handset, a multi-section personal digital assistance (PDA), or some other apparatus. The wireless communication system may be a Code Division Multiple Access (CDMA) system, a Global System for Mobile Communications (GSM) system, and so on. Wireless device 100 is capable of providing bidirectional communication via a receive path and a transmit path.

For the receive path, signals transmitted by base stations are received by an antenna 112, routed through a duplexer (D) 114, and provided to a receiver unit (RCVR) 116. Receiver unit 116 conditions and digitizes the received signal and provides input samples to a digital section 120 for further processing. For the transmit path, a transmitter unit (TMTR) 118 receives data to be transmitted from digital section 120, processes and conditions the data, and generates a modulated signal, which is routed through duplexer 114 and transmitted via antenna 112 to the base stations.

Digital section 120 includes various processing and interface units such as, for example, a modem processor 122, a video processor 124, a graphics processor 126, an application processor 128, a controller 130, a display processor 140, external bus interfaces (EBIs) 142 and 144, and a mobile digital display interface (MDDI) host 146. Modem processor 122 performs processing for data transmission and reception (e.g., encoding, modulation, demodulation, decoding, and so on). Video processor 124 performs processing on video content (e.g., still images, moving videos, moving texts, and so on) for video applications such as camcorder, video playback, video conferencing, and so on. Graphics processor 126 performs processing on graphics (e.g., 2-dimensional (2D) models, 3D models, and so on) for graphics applications such as video games, 3-D avatars, and so on. Application processor 128 performs processing for various applications such as, e.g., multi-way calls, web browsing, phone dialer application, media player, games, user interface and so on. Display processor 140 performs certain post-processing tasks to facilitate the display of videos, graphics, texts, and so on, on an LCD unit 180. LCD unit 180 may be any type of electronic display such as, e.g., thin film transistor (TFT), organic light emitting diode (OLED), cathode ray tube (CRT), and so on. Controller 130 may direct the operation of various processing and interface units within digital section 120. The various units within digital section 120 may communicate via one or more buses 132.

EBIs 142 and 144 also couple to buses 132. EBI 142 facilitates transfer of data between digital section 120 and a volatile main memory 152, which may be a random access memory (RAM), a static RAM (SRAM), a dynamic RAM (DRAM), a synchronous DRAM (SDRAM), and so on. EBI 144 facilitates transfer of data between digital section 120, a non-volatile memory 154 (e.g., a NAND Flash memory), and LCD unit 180. EBI 144 may also couple directly to display processor 140 via a dedicated port (as shown in FIG. 1). Other processors may then utilize EBI 144 for data exchanges even if display processor 140 fully occupies the dedicated port for data transfers. MDDI host 146 provides an efficient high-speed serial interface between the digital section and LCD unit 180 and functions in similar manner as an IEEE 1394 FireWire, which provides efficient data interfacing between computers, peripherals, and consumer electronics products. MDDI host 146 may perform various functions such as, e.g., serial-to-parallel conversion, network control, and so on.

Digital section 120 may be implemented with one or more DSPs, micro-processors, reduced instruction set computers (RISCs), and so on. Digital section 120 may also be fabricated on one or more application specific integrated circuits (ASICs) or some other type of integrated circuits (ICs).

For the embodiment shown in FIG. 1, LCD unit 180 includes an LCD controller 182, a MDDI client 184, a frame buffer 186, and an LCD screen 188. LCD controller 182 interfaces with EBI 144 and facilitates transfer of image data from digital section 120 to frame buffer 186. MDDI client 184 interfaces with MDDI host 146 and may alternately be used to efficiently transfer image data to frame buffer 186. In other embodiments, MDDI host 146 and MDDI client 184 may be omitted from wireless device 100 and LCD unit 180, respectively. Frame buffer 186 stores a frame of image data to be displayed on LCD screen 188. In the following description, "image data" is used interchangeably with picture element (pixel) data and is data suitable for presentation on LCD screen 188.

Figure 2:
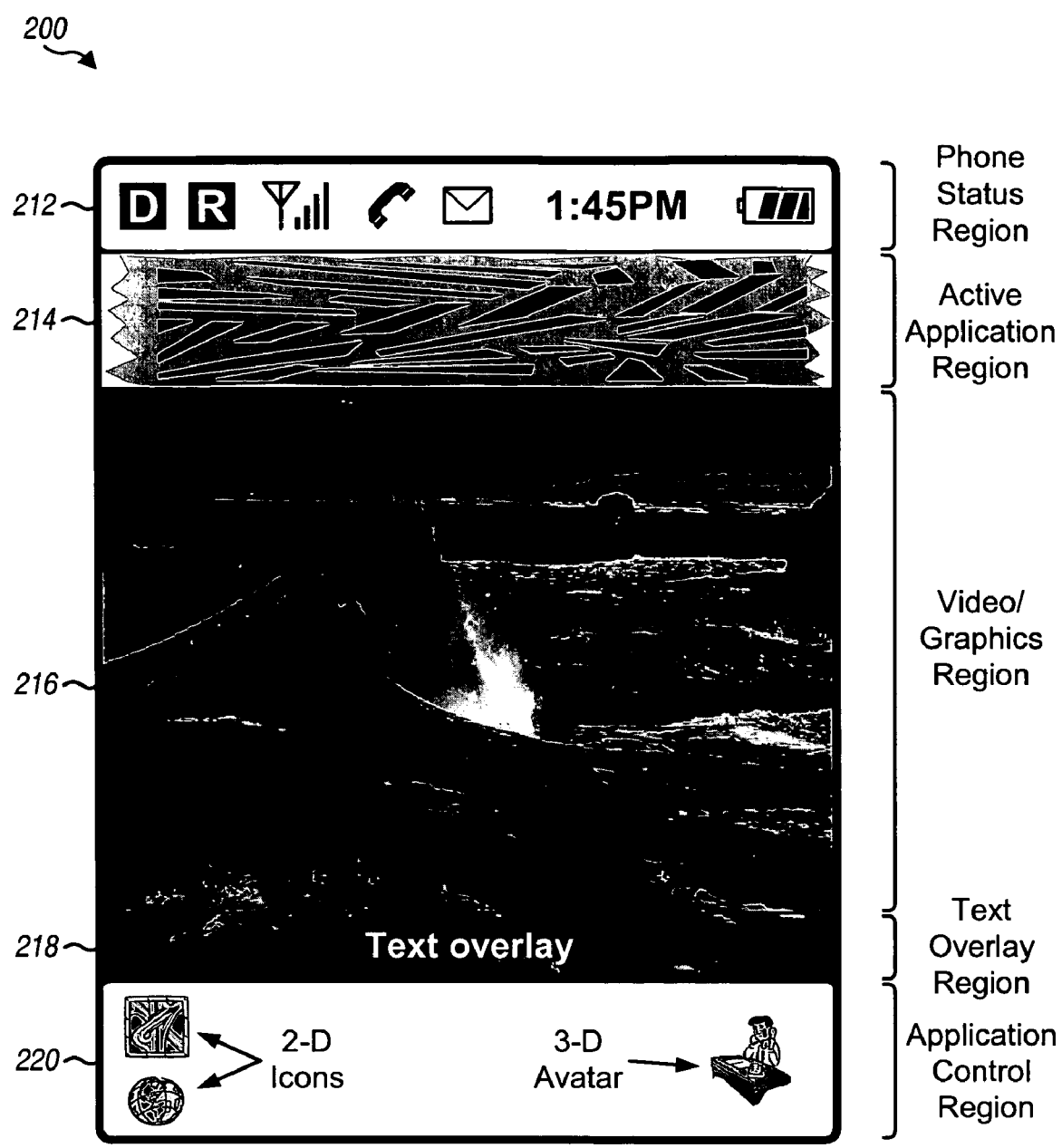
FIG. 2 shows an exemplary display generated by the display processor.

FIG. 2 shows an exemplary display 200 that may be generated by display processor 140. Display 200 is partitioned into multiple regions. Each region may be associated with a different data source and a different update rate. For the embodiment shown in FIG. 2, display 200 includes a phone status region 212, an active application region 214, a video/graphics region 216, a text overlay region 218, and an application control region 220.

Phone status region 212 may show various annunciators (or icons) that indicate the status of wireless device 100. Such annunciators may include, e.g., a mode indicator (e.g., digital (D) or analog), a roaming indicator (e.g., roaming (R) or in-network), a signal strength indicator, an "in use" indicator, a voicemail indicator, a time-of-the day indicator, a battery level indicator, and so on. Region 212 may be updated by application processor 128, e.g., at a rate of about once per second. Some annunciators may be static and either enabled or disabled. Other annunciators (e.g., the time-of-the-day and signal strength indicators) may be updated periodically. Display processor 140 may simply transfer the image data for region 212 over to LCD unit 180.

Active application region 214 may show various controls for applications running on wireless device 150. These controls may be, e.g., video controls, volume control, a tape counter, and so on. The update rate for region 214 may be very slow. Display processor 140 may simply transfer the image data for region 214 over to LCD unit 180.

Video/graphics region 216 may show a still image, a video, graphics, texts, and so on. Display processor 140 may perform post-processing on image data for video and graphics, as described below. Region 216 may be updated at a designated rate (e.g., about 5 to 30 Hertz). Region 216 may be a portion of display 200 (as shown in FIG. 2) or may occupy the entire display. The video, graphics, and texts may also be rotated by 90° and displayed in landscape (instead of portrait) orientation. Region 216 may show multiple images, e.g., when a user is searching through photograph thumbnails. Region 216 may also show multiple videos, e.g., for a teleconference call with other users in one or more other locations, where one of the videos may be for the local end. Display processor 140 performs rotation (if necessary) for each image/video prior to the transfer to LCD unit 180. Display processor 140 may also perform left-to-right flip for each video in a teleconference call so that the user experiences the same familiar effect as when looking in a mirror.

Text overlay region 218 may show text that has been overlaid over video/graphics. The overlaid text may be scrolling or static and may be for various types of information such as, e.g., stock ticker, closed-caption text, and so on. Scrolling text may be updated at the same rate as the background video/graphics.

Application control region 220 may show various controls for applications. These controls may be in the form of 2-D icons, 3-D avatars, and so on. The icons may be composed once and may remain static unless the entire display content is changed. The avatars may be interactive, may move around various regions within display 200, may be in motion (e.g., juggle), and so on. Display processor 140 may compose the image data for the background, icons, and avatars over to LCD unit 180. Display processor 140 may also update the avatars on top of the background at a sufficient rate (e.g., around 20 Hertz/second), if and when the avatars are active, using the transparency capability of the display processor.

FIG. 2 shows an exemplary display. In general, a display may include any number of regions, and each region may show any type of information. Different types of information may be processed in different manners by display processor 140.

Referring back to FIG. 1, processors 124 through 128 may provide image data for display on LCD screen 188. These processors may store their image data in main memory 152, which may be used as an application device buffer. Display processor 140 is located between main memory 152 and frame buffer 186 and can efficiently transfer image data from main memory 152 to LCD unit 180. A common display processor 140 can efficiently support processors 124 through 128 and reduce redundant circuitry. Display processor 140 performs an image transfer by retrieving image data from main memory 152 and writing the image data to frame buffer 186. Frame buffer 186 is "updated" with new image data by display processor 140 whenever the content for LCD screen 188 changes. LCD screen 188 is "refreshed" with the image data from frame buffer 186 periodically (e.g., at 60 to 75 Hertz).

Display processor 140 may perform a set of post-processing functions on the image data on-the-fly while transferring the image data to LCD unit 180. These post-processing functions are selected to (1) reduce processing burdens on processors 124 through 128 and (2) improve bandwidth efficiency of main memory 152, so that image data is not read from or written to the memory multiple times for a given task. In an embodiment, display processor 140 supports the following functions:

Frame update synchronization—update frame buffer 186 in a manner to avoid causing visual artifacts on LCD screen 188;

Image transformations—rotation (90°, 180°, 270°), flip/reflection (left/right and/or top/bottom), and scaling;

Frame composition—image copy, copy with transparency, and alpha blending;

Format conversion—color depth (up/down sampling), color space (YCrCb & RBG) and color format (565, 666, 4:2:0, and so on);

Script processing—execute instructions stored as scripts.

These functions are described in further detail below. Display processor 140 may also be designed to perform fewer, different, and/or additional functions.

Figure 3:
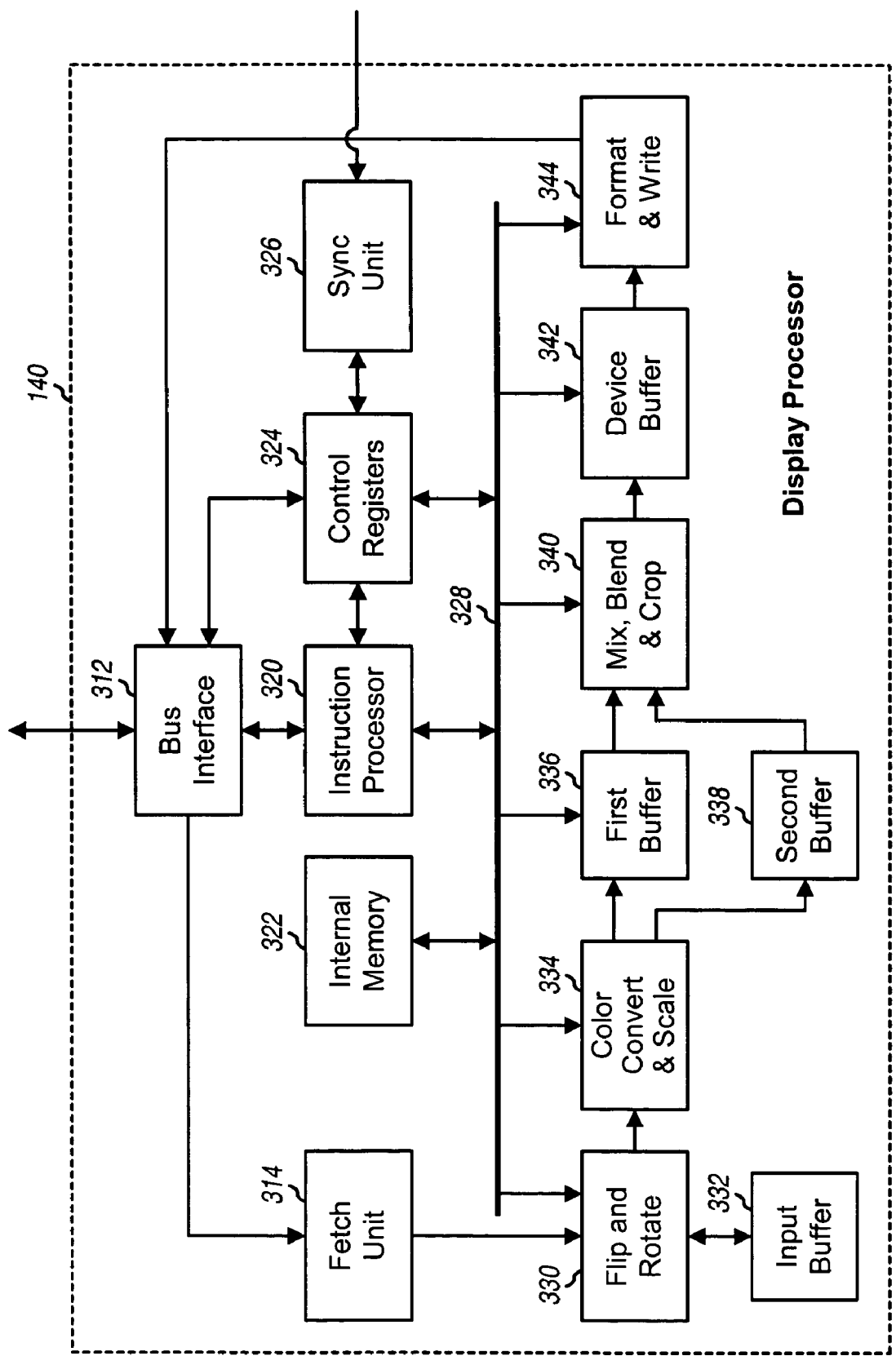
FIG. 3 shows a block diagram of the display processor.

FIG. 3 shows a block diagram of an embodiment of display processor 140. A bus interface unit 312 handles data exchanges for display processor 140. Bus interface unit 312 receives input image data from main memory 152 in an efficient manner based on the design of buses 132 (e.g., in four-beat bursts, with each burst providing 32 bits via a 32-bit bus in four clock cycles). A fetch unit 314 generates addresses for bus interface unit 312 for data read. The input image data is processed and then sent via bus interface unit 312 to either EBI 144 or MDDI host 146 for forwarding to LCD unit 180. Bus interface unit 312 provides the output image data in a selected format (e.g., as a series of single pixels encapsulated in single-beat word transfers).

An instruction processor 320 receives instructions/commands (e.g., from controller 130) and directs the operation of various units within display processor 140. The instructions describe the functions to be performed by display processor 140 to update the image data for all or a portion of the LCD screen. The instructions may be provided in a script (or a list).

In this case, instruction processor 320 processes the instructions in the script until a termination condition (e.g., a STOP, END, or HALT instruction) is encountered. At this time, instruction processor 320 may set a status flag to inform controller 130 that the script has been completed and may then go idle and wait for the next script. Scripts may be stored in main memory 152 or non-volatile memory 154, and instruction processor 320 may be provided with a pointer to the next script to be executed.

Registers 324 store parameters for various processing units within display processor 140 and allow controller 130 to monitor and control the display processor. The parameters in registers 324 may be set by scripts and/or by instruction processor 320 and may be monitored (e.g., for test and debug purposes).

A synchronization (sync) unit 326 keeps track of a read pointer and a write pointer for frame buffer 186 and determines whether it is safe to write image data for a new frame to frame buffer 186 without causing "tearing" on the LCD screen. The LCD screen is typically refreshed in sequential order, one line at a time, with the image data from frame buffer 186. The read pointer indicates the next line of image data for a current frame to retrieve from frame buffer 186 to refresh the LCD screen. The write pointer indicates the line in frame buffer 186 where image data for the new frame is to be stored. To avoid causing visual artifacts on LCD screen 188, the write pointer should lag the read pointer. If image data for the new frame is written to frame buffer 186 past the read pointer, then LCD screen 188 will be refreshed with the image data for the new frame right after the image data for the current frame. An undesirable artifact commonly referred to as tearing would then appear on the LCD screen. Synchronization unit 326 maintains coarse lock to the timing of LCD unit 180 to ensure that the write pointer does not pass the read pointer.

In an embodiment, display processor 140 operates on image data in blocks. A frame of dimension H×W, where H is the number of lines in the frame and W is the number of pixels per line, may be partitioned into a 2-D array of blocks. In general, a block may be defined to be of any dimension and does not need to be square. The block size may be selected based on various factors such as, for example, the manner in which memory access may be efficiently performed via buses 132, the processing capabilities of the units within display processor 140, the frame size, and so on. A square block of dimension N×N, where N is a power of two, may provide good performance. For example, display processor 140 may operate on 16×16 blocks, 8×8 blocks, and so on. A 16×16 block size may be advantageous, for example, if buses 132 are optimized to provide 16 bytes of data for each memory access. For clarity, much of the description below is for an 8×8 block size.

A flip and rotate unit 330 receives input image data from bus interface unit 312, performs flip and/or rotate on the input image data as directed by instruction processor 320, and stores its output data in an input buffer 332. An image may be partitioned into multiple strips, and each strip may span the entire width of the image and include multiple blocks. Unit 330 may perform flip and/or rotate on one or more blocks within a given strip, for one or more strips, and so on. Input buffer 332 stores an image data block that has been fetched from main memory 152 and processed by flip and rotate unit 330. The image data block in input buffer 332 is in the correct orientation for the LCD screen.

A color convert and scale unit 334 receives the data from input buffer 332, converts the data from an input video format to an output video format if necessary, and stores pixel data in either a first buffer 336 or a second buffer 338. The input video format may be, for example, a luminance and chrominance (YCrCb) format, and the output video format may be, for example, a red, green, and blue (RGB) format. Unit 334 may also scale the image up or down in size prior to storage in buffer 336 or 338.

First buffer 336 stores a data block for a primary image. This data block may be a normal size N×N block or a smaller size block if display processor 140 is processing an edge of the image. Second buffer 338 stores a data block for a secondary image. The two data blocks stored in buffers 336 and 338 may be mixed and combined to form an output block for a composite image. If mixing or text overlay is not performed, then first buffer 336 stores the data block for the LCD screen and second buffer 338 is idle. In any case, first buffer 336 holds the data block until there is room for the block in a device buffer 342.

A mix, blend, and crop unit 340 receives data blocks from buffers 336 and 338, combines the data blocks if applicable, and provides an output data block to device buffer 342. Unit 340 may perform cropping of an input data block. Unit 340 may also perform alpha-blend or transparency transformation on the data blocks prior to outputting to device buffer 342.

Device buffer 342 acts as a "virtual" frame buffer, accepts blocks of pixel data from unit 340, and provides pixel data in a row format that LCD unit 180 expects. Device buffer 342 may have the same width as frame buffer 186 to efficiently provide lines of pixel data to the frame buffer. In one embodiment, device buffer 342 stores two rows of data blocks, which cover only a portion of the H×W frame size. Lines from one row of data blocks may be retrieved from device buffer 342 and written to frame buffer 186, while new data blocks for another row are written to device buffer 342. In another embodiment, device buffer 342 stores one row of data blocks. Whenever a line is retrieved from device buffer 342 and written to frame buffer 186, sufficient memory space may be freed up to store one or more new data blocks. For this embodiment, each data block may be stored in non-contiguous locations within device buffer 342, and the appropriate memory addresses are generated for each block that is written to or retrieved from device buffer 342. In yet another embodiment, device buffer 342 stores image data for an entire frame, e.g., with video, graphics, text, and so on, for all regions as shown in FIG. 2. In general, device buffer 342 may store image data for all or a portion of a frame, and may store the image data in various manners. Device buffer 342 looks like a whole frame buffer even though its actual size may be much smaller. Device buffer 342 facilitates block-to-line conversion, stores data by blocks, and provides data by lines.

A format and write unit 344 receives the pixel data from buffer 342, formats the pixel data in an output format expected by the recipient of the data (e.g., LCD unit 180 or MDDI host 146), and provides the formatted pixel data via bus interface unit 312 to EBI 144 or MDDI host 146 for forwarding to LCD unit 180. Unit 344 may support various output formats such as, for example, 18 bits/pixel sent in three 6-bit writes, 16 bits/pixel sent in one 16-bit write, MDDI format, and so on. MDDI host 146 has the ability to throttle unit 344 so that display processor 140 does not waste bus bandwidth waiting for the MDDI host to make room in its input FIFO (first-in-first-out) buffer.

An internal memory 322 stores data and program code used by various processing units within display processor 140. A bus 328 interconnects various units within display processor 140. The processing units within display processor 140 are described in further detail below.

1. Frame Synchronization

Synchronization unit 326 controls the writing of data to LCD unit 180 to ensure that tearing does not occur on the LCD screen. Two frame buffers are often used so that data for a new frame is written to one frame buffer while data for a current frame is retrieved from the other frame buffer and provided to the LCD screen. The two frame buffers are operated in a ping-pong manner so that data is retrieved from one frame buffer for an entire frame, then from the other frame buffer for the next frame, then back to the first frame buffer for the following frame, and so on. Data for a new frame is written to the frame buffer that is not being accessed for the LCD screen. If two frame buffers are not used (e.g., in order to reduce memory requirement), then synchronization unit 326 ensures that frame buffer 186 is updated so that the write pointer does not pass up the read pointer in order for visual artifacts to not appear on the LCD screen.

Figure 4A:
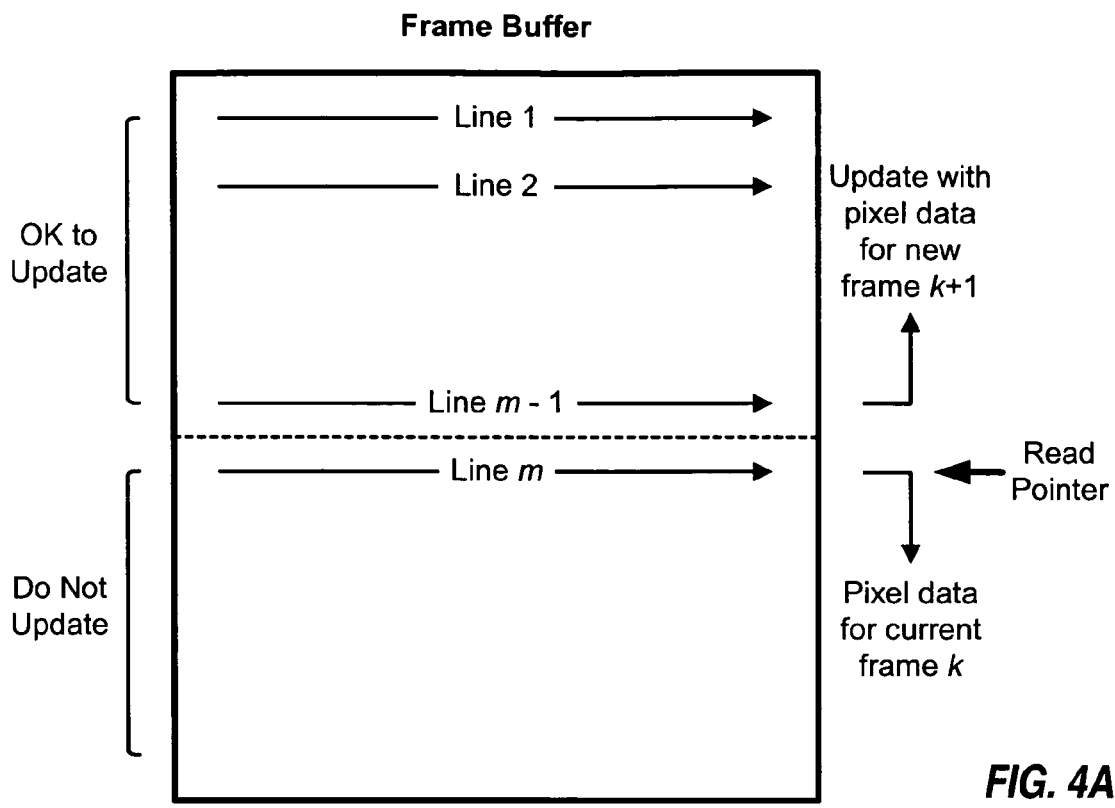
FIGS. 4A and 4B show the content of the frame buffer at two time instants.

FIG. 4A shows the content of H×W frame buffer 186 used to refresh LCD screen 188 at a given time instant. Pixel data for a current frame k being displayed on LCD screen 188 was written to frame buffer 186 at an earlier time. The refresh process reads pixel data from frame buffer 186, typically one row at a time, and writes the pixel data onto LCD screen 188. The refresh process starts from the top of LCD screen 188 and progresses to the bottom of the screen. For the example shown in FIG. 4A, the first m−1 rows of the current frame k have been read from frame buffer 186 and transferred to LCD screen 188. The m-th row of frame k is currently being refreshed on LCD screen 188 and is indicated by the read pointer. Frame buffer 186 is typically organized in the same fashion as the refresh order of LCD screen 188. Thus, when the read pointer is at line m, the first part of the frame buffer from lines 1 through m−1 has already been used and is available to be updated with pixel data for a new frame k+1, which has not yet appeared on the LCD screen. Rows m and beyond in frame buffer 186 should not be updated yet, or else LCD screen 188 will display part of the new frame k+1 along with the current frame k.

Figure 4B:
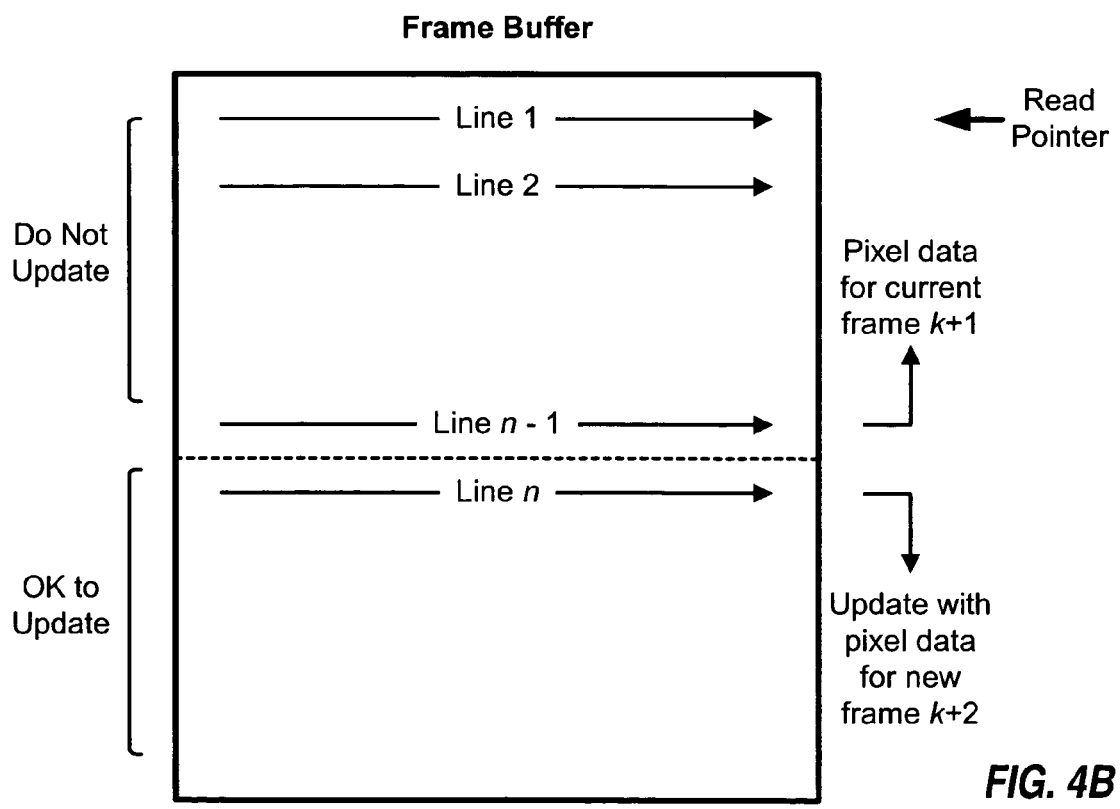

FIG. 4B shows the content of frame buffer 186 at a later time instant. When the read pointer reaches the end of frame buffer 186, it wraps around from the last line and restarts at line 1. Pixel data for line 1 of the new frame k+1 was written in frame buffer 186 at an earlier time (e.g., in FIG. 4A). For the example shown in FIG. 4B, the first n−1 rows of the new frame k+1 have been written to frame buffer 186 and can be provided to LCD screen 188. Row n and beyond may be updated with pixel data for the following frame k+2.

A refresh cycle is a refresh of all H lines of a given frame. After the last pixel of the last line for the frame has been refreshed on LCD screen 188, the read pointer wraps around from line H back to line 1 (as shown in FIG. 4B). Pixel data for line 1 is again retrieved from frame buffer 186 and written to LCD screen 188. Prior to the read pointer wrapping around, the top rows of frame buffer 186 should be updated with pixel data for the new frame. Frame buffer 186 should thus contain pixel data for the current frame to be refreshed after the read pointer location (after line m in FIG. 4A and after line 1 in FIG. 4B). Frame buffer 186 may contain pixel data for the new frame before the read pointer location (before line m in FIG. 4A and before line H in FIG. 4B).

The refresh rate for LCD screen 188 may be one or multiple times (e.g., twice) the update rate for frame buffer 186. Frame buffer 186 is only updated when there is new content for LCD screen 188. If the refresh rate is multiple times the update rate, then frame buffer 186 is updated during the last refresh cycle for the current frame. For example, if the refresh rate (e.g., 60 Hertz/second) is twice the update rate (e.g., 30 frames/second), then there are two refresh cycles for every update cycle. In this case, frame buffer 186 is updated at a rate that is (1) longer than one refresh cycle so that the write pointer does not pass up the read pointer, which would lead to tearing with the new image, and (2) shorter than two refresh cycles, so that pixel data for the new frame are timely available to avoid tearing with the old frame.

The updating of frame buffer 186 should be somewhat synchronized to the read pointer. The read pointer is normally maintained by LCD controller 182 and is typically not available to other units external to LCD unit 180. In this case, synchronization unit 326 may use a vertical synchronization signal from LCD unit 180 to reconstruct a local copy of the read pointer. The vertical synchronization signal may include a pulse at the start of each refresh cycle. Synchronization unit 326 may maintain an internal counter that increments based on an input clock and is reset by the pulse on the vertical synchronization signal. Synchronization unit 326 has knowledge of the number of lines (H) for frame buffer 186 and can ascertain the approximate number of clock cycles for each refresh cycle. Synchronization unit 326 can then estimate the number of clock cycles needed to refresh one line of LCD screen 188 and can determine the read pointer location based on the internal counter value. The internal counter is thus used to estimate the timing of LCD unit 180 and is reset in each refresh cycle so that timing errors do not accumulate. Alternatively, synchronization unit 326 may be able to obtain the read pointer location directly from LCD controller 182 and may keep track of the read pointer that way.

Display processor 140 only needs coarse or general knowledge of the read pointer location. For example, if the read pointer is known to be somewhere between lines 118 and 121, then it may be safe to update the region that is a few lines prior to the read point location (e.g., the region prior to line 112). Thus, reconstruction of the read pointer to several percent accuracy may be sufficient to update frame buffer 186 without causing artifacts on LCD screen 188.

2. Flipping and Rotation

Flip and rotate are useful functions because different LCD units may have arbitrary orientation of the LCD screen with respect to the sources of the images being displayed. For example, a wireless device may have an LCD screen with a landscape orientation and an application may expect a portrait screen. As another example, a cellular phone may be used for a teleconference call and the image for a remote end may be encoded by an equipment from a manufacturer different from the phone manufacturer. As yet another example, a cellular phone may have a camera in a knuckle (which is the hinge of a flip-phone), and an LCD screen may be twisted around almost 360° so that a camera on the phone may point in almost any direction with respect to the LCD screen.

In an embodiment, flip and rotate unit 330 can rotate an image in four different 90° increments—0°, 90°, 180°, and 270°. Unit 330 may also apply four different flip options to the image—unflipped, flipped left-to-right, flipped up-and-down, and flipped both left-to-right and up-and-down. A total of 16 possible combinations of rotate and flip are thus possible.

Figure 5:
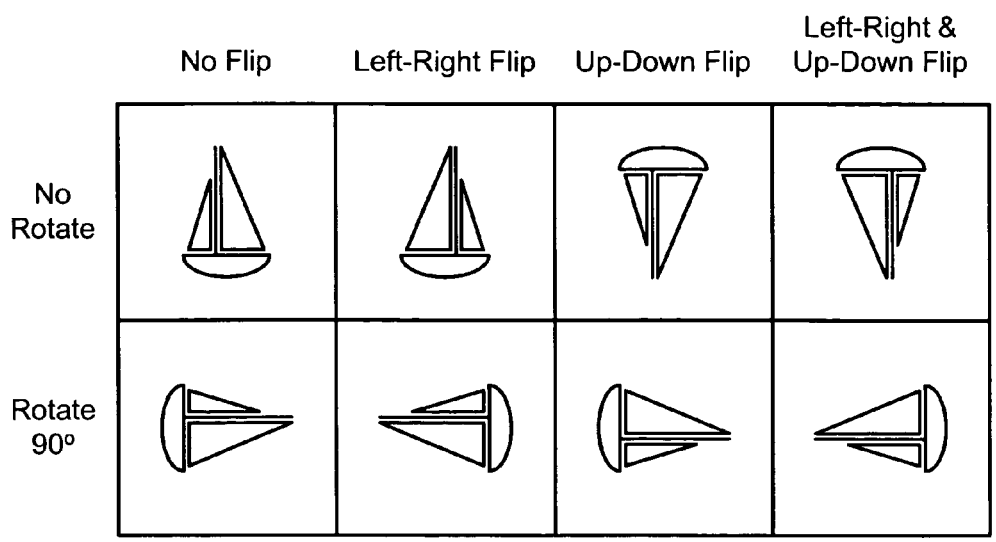
FIG. 5 shows 8 image orientations for 16 different rotate and flip combinations.

FIG. 5 shows eight unique image orientations for the 16 possible rotate and flip combinations. Some combinations of rotate and flip produce the same image orientation and may thus be combined. For example, a rotation by 180° plus a left-to-right and an up-and-down flip produces the original image with no rotation and no flip. The eight image orientations shown in FIG. 5 cover all of the 16 possible rotate and flip combinations. Rotations by 180 and 270 in combination with the four different flip options may be mapped to the eight image orientations shown in FIG. 5.

Flip and rotate unit 330 performs flip and rotation of images prior to forwarding to LCD screen 188. LCD controller 182 typically expects to receive pixel data in rows. Frames of pixel data are also normally stored in main memory 152 by rows. Unit 330 may perform a 90° rotation by reading pixel data by columns from main memory 152 and writing the pixel data by rows to LCD controller 182. Main memory 152 is typically an SDRAM, which is efficient for fetching a chunk of data from a contiguous range of memory addresses but is inefficient for fetching small pieces of data that are separated from one another by some address distance. Since adjacent pixels in the same column may be separated by several hundred address locations (or the width of a row), accessing main memory 152 one column at a time may be very inefficient and may utilize a large percentage of the available bandwidth for main memory 152.

Flip and rotate unit 330 can efficiently flip and rotate an image by operating on a block of pixel data at a time. Unit 330 first fetches image data from main memory 152 in a block-by-block fashion, starting with the block for the upper leftmost corner of frame buffer 186. Unit 330 performs a 90° rotation on each data block fetched from main memory 152 and stores the rotated data block in input buffer 332. Once the read point for frame buffer 186 has advanced beyond the line where the rotated data block is to be placed, display processor 140 writes the block to the frame buffer.

Figure 6:
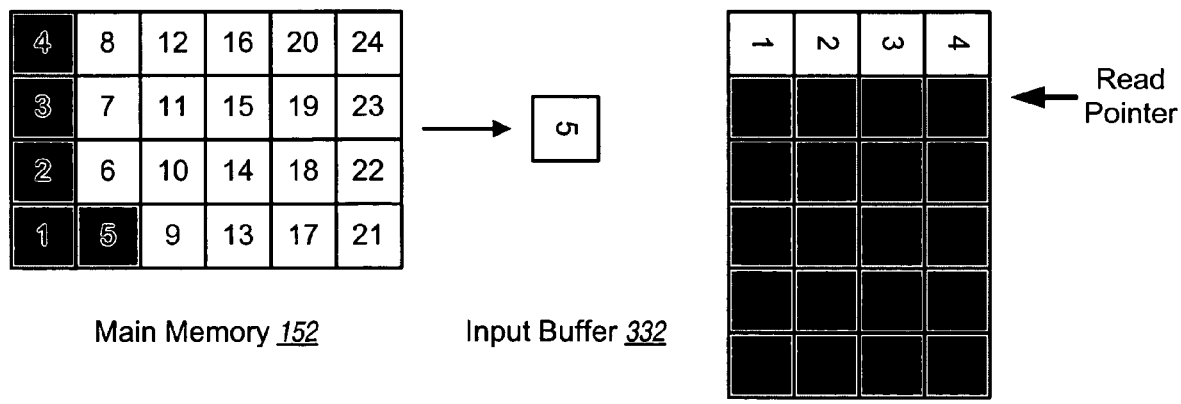
FIG. 6 shows 90° rotation of an image.

FIG. 6 shows 90° rotation of an image. For this example, an image composed of 24 blocks is stored in a 4×6 array of blocks in main memory 152. The image is to be rotated by 90° and written into a 6×4 array of blocks in frame buffer 186. Each column of blocks in main memory 152 is also called a strip.

Display processor 140 first fetches block 1 from main memory 152, which is flipped by unit 330 and stored in input buffer 332. Display processor 140 then writes the rotated block 1 to frame buffer 186 when the read pointer has advanced past the point where block 1 will occupy, so that tearing does not occur. Display processor 140 then fetches, rotates, and writes each of the remaining blocks 2, 3, and 4 in the first strip, without having to wait for the read pointer. After the first strip has been written to frame buffer 186, display processor 140 fetches and rotates block 5, which is the first block of the second strip (as shown in FIG. 6). Again, display processor 140 waits for the read pointer to advance past the point where block 5 will occupy in frame buffer 186. When the read pointer has advanced sufficiently far, display processor 140 writes block 5 to frame buffer 186, then fetches, rotates, and writes each of the remaining blocks 6, 7, and 8 in the second strip. The same processing is performed for each of the remaining strips for the image. Display processor 140 waits for the read pointer to wrap around before writing out the rotated blocks for the last strip of the image.

3. Video Functions

Figure 7A:
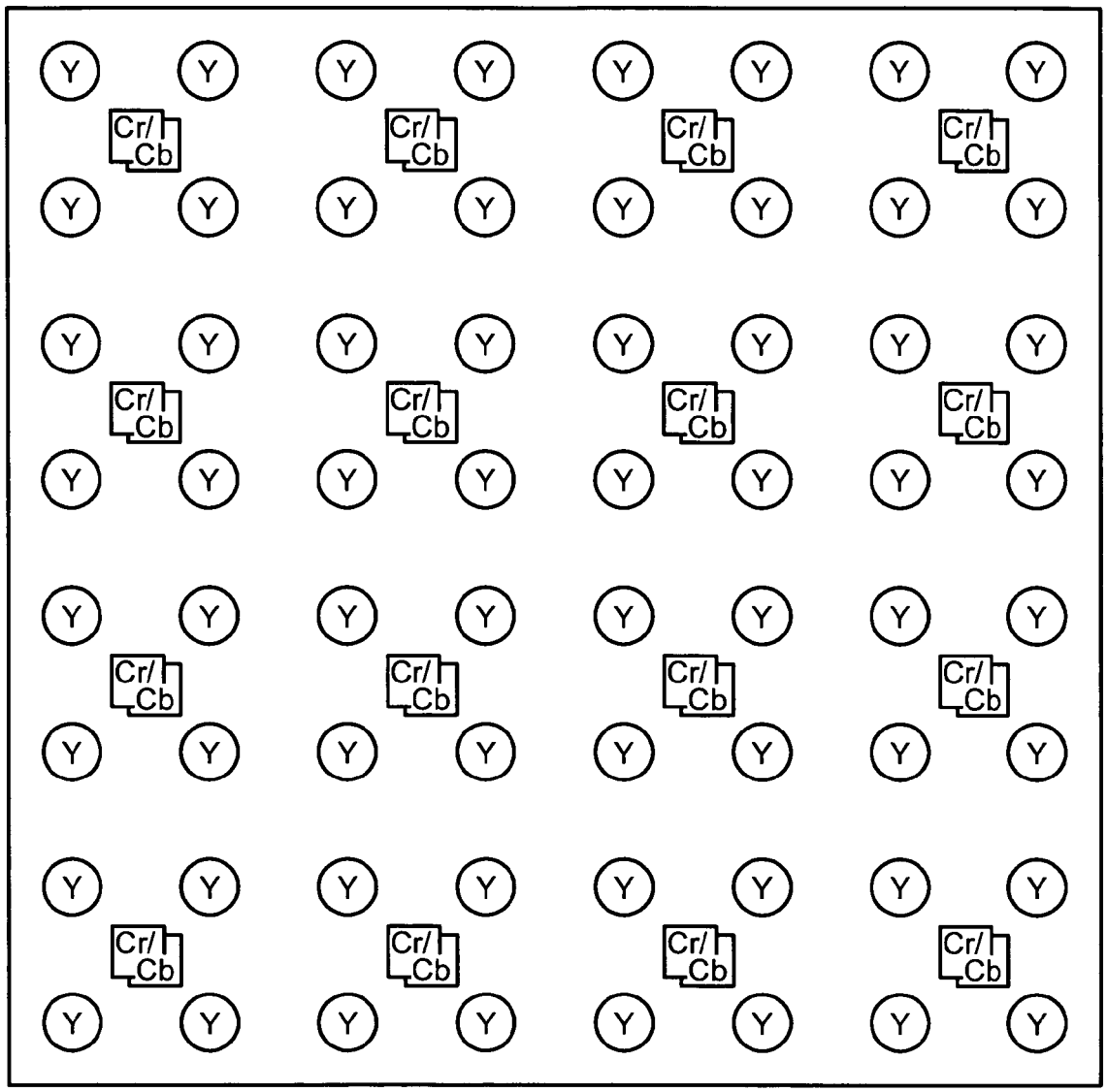
FIG. 7A shows an 8×8 block of pixels for a 4:2:0 YCrCb format.

FIG. 7A shows an exemplary 8×8 block of pixels for a 4:2:0 YCrCb format that is commonly used for video. For the YCrCb format, a color image is represented by (1) a luminance (Y) component that contains the intensity (or black/white portion) of the image and (2) red (Cr) and blue (Cb) chrominance components that carry color information for the image. Each of the 64 pixels in the 8×8 block is associated with a (e.g., 8-bit) luminance value that is represented by a circled Y. For the 4:2:0 YCrCb format, the red and blue components are subsampled such that there is one (e.g., 8-bit) Cr value and one (e.g., 8-bit) Cb value for each group of four pixels. The Cr and Cb values are located in the center of the group of four pixels with off-site subsampling (which is shown in FIG. 7A) and between two vertical pixels with co-site sampling (which is not shown in FIG. 7A).

LCD unit 180 typically expects each pixel to be in the RGB format and to have three color components—red (R), green (G), and blue (B). The three color components for each pixel may be obtained from the Y, Cr, and Cb values for that pixel. For the 4:2:0 YCrCb format shown in FIG. 7A, display processor 140 upsamples the Cr and Cb values for each group of four pixels in the 8×8 block to obtain Cr and Cb values at each of the 8×8 pixel locations in the block. An image with all three Y, Cr, and Cb components at each pixel location is in a 4:4:4 YCrCb format.

Chrominance upsampling may be performed in various manners. For example, the Cr and Cb values for each group of four pixels may simply be copied and used as the Cr and Cb values for each of the four pixel locations in the group. The Cr values may also be filtered (in one or two dimensions) and then resampled at the 64 pixel locations. In an embodiment, color convert and scale unit 334 computes a Cr value for each pixel location in the 8×8 block based on four Cr values nearest to that pixel location using a bilinear filter.

Figure 7B:
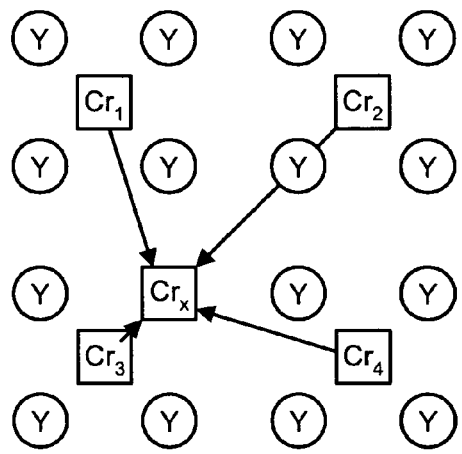
FIG. 7B shows chrominance upsampling using a bilinear filter.

FIG. 7B shows chrominance upsampling using a bilinear filter to obtain a Cr value, which is labeled as $Cr_x$, for a target pixel location. The four Cr values used to derive the $Cr_x$ value are the four closest Cr values to the target pixel location and are labeled as $Cr_1$, $Cr_2$, $Cr_3$, and $Cr_4$. The $Cr_x$ value may be computed as follows:

$$Cr_x = \frac{9 \cdot Cr_3 + 3 \cdot Cr_1 + 3 \cdot Cr_4 + Cr_2}{16}. \qquad \text{Eq (1)}$$

As shown in equation (1), $Cr_3$ is given the most weight in the computation of the $Cr_x$ value since $Cr_3$ is closest to the target pixel location. Conversely, $Cr_2$ is given the least weight since it is farthest from the target pixel location. The four coefficients 9, 3, 3, and 1 for the four closest Cr values are selected such that the $Cr_x$ value may be computed with simple additions and shifts (for multiplies by a power of two) instead of using more complex and costly multipliers.

Color convert and scale unit 334 may perform the computation shown in equation (1) to obtain an upsampled Cr value for each of the 64 pixel locations in the 8×8 block. To compute the upsampled Cr values for the pixel locations along the four edges of the block, Cr values for neighboring blocks may be fetched and used in the computation of the upsampled Cr values. For example, a 6×6 block of Cr values (for a 12×12 extended image block) may be fetched and used to compute the upsampled Cr values for the 64 pixel locations in the 8×8 block. The center 16 Cr values in the 6×6 Cr block belong to the current 8×8 block, and the remaining 16 Cr values in the 6×6 block are for neighboring 8×8 blocks. The upsampling for the Cb values may be performed in similar manner as for the Cr values.

Since LCD unit 180 typically accepts images in the RGB format, display processor 140 may perform color conversion on each upsampled YCrCb block to obtain a corresponding RGB block. The conversion from YCrCb to RGB may be expressed in matrix form, as follows:

$$\begin{bmatrix} R \\ G \\ B \end{bmatrix} = \begin{bmatrix} 1.1644 & 0 & 1.596 \\ 1.1644 & -0.3918 & -0.813 \\ 1.1644 & 2.0172 & 0 \end{bmatrix} \cdot \left( \begin{bmatrix} Y \\ Cb \\ Cr \end{bmatrix} - \begin{bmatrix} 16 \\ 128 \\ 128 \end{bmatrix} \right). \qquad \text{Eq (2)}$$

Equation (2) is described in ITU-R Recommendation 601 (Rec 601), which is publicly available.

Color convert and scale unit 334 may perform color conversion on the Y, Cr, and Cb values for each pixel location to obtain the corresponding R, G, and B values for that pixel location. The computation shown in equation (2) may be performed with multipliers having appropriate resolutions for the coefficients (e.g., 12 bits), the input YCrCb components (e.g., 8 bits), and the output RGB components (e.g., 6 or 8 bits).

Display processor 140 may also scale an image up or down in size. Scaling (or resampling) may be used for various purposes such as, e.g., zooming in or out an image (e.g., for camera viewfinder), placing multiple images on the LCD screen (e.g., for a photo thumbnail or a teleconference call), and so on. The scaling may be performed on an image that is in the 4:2:0 YCrCb format, the 4:4:4 YCrCb format, or some other format. In general, an image may be scaled by any M/L ratio, where M is the number of horizontal pixels in the new resolution and L is the number of horizontal pixels in the old resolution. However, computation is simplified for scaling by a power of two, e.g., 2, 4, 8, 16, and so on.

The computation for a given component X for a downscale by 1/L, where L may be 2, 4, 8, 16, and so on, may be expressed as:

$$X_{avg} = \frac{1}{L \cdot L} \cdot \sum_{j=1}^{L} \sum_{i=1}^{L} X(i, j), \qquad \text{Eq (3)}$$

where
X may denote red, green, or blue component for the 4:4:4 RGB format or luminance for the 4:2:0 YCrCb format;
X(i,j) is the component value at pixel location (i,j); and
$X_{avg}$ is the average component value for an L×L box.

Since one set of Cr and Cb values is available for each group of four pixels for the 4:2:0 YCrCb format, the computation for the chrominance components for a downscale by 1/L is dependent on the value of L.

Figure 8A:
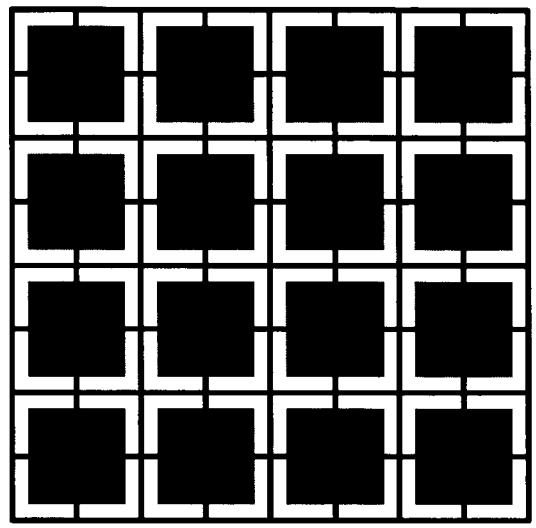
FIGS. 8A, 8B, and 8C show downscale by ½, ⅜ and ⅝, respectively.

FIG. 8A shows a downscale by ½ for an 8×8 block. Four luminance values in each 2×2 box are added and divided by four (or shifted to the right by two bits) to obtain an average Y value for the box. No computation is needed for the Cr and Cb components since one set of Cr and Cb values is already provided for each group of four pixels for the 4:2:0 YCrCb format.

For a downscale by ¼, 16 luminance values in each 4×4 box are added and divided by 16 to obtain an average Y value for the box. The four Cr values for each 4×4 box are added and divided by four to obtain an average Cr value for the box. The four Cb values for each 4×4 box are also added and divided by four to obtain an average Cb value for the box. Chrominance upsampling is not needed when performing a downscale by ¼ or more.

For a downscale by ⅛, 64 luminance values in an 8×8 block are added and divided by 64 to obtain an average luminance value for the block. The 16 Cr values for the 8×8 block are added and divided by 16 to obtain an average Cr value. The 16 Cb values for the 8×8 block are also added and divided by 16 to obtain an average Cb value. Chrominance upsampling is not needed for downscaling by ⅛.

Figure 8B:
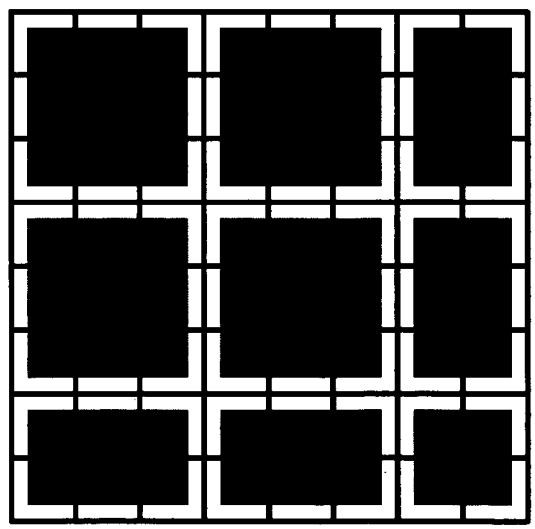

FIG. 8B shows a downscale by ⅜ for an 8×8 block. The 64 pixels in the 8×8 block are arranged into 9 boxes, e.g., as shown in FIG. 8B. Each box contains 9, 6, or 4 pixels. The luminance values in each box are added and divided by the number of pixels in the box to obtain the average Y value for the box. The chrominance components may be upsampled to obtain a Cr value and a Cb value for each pixel. The chrominance values for each color component may then be added and divided in the same manner as for the luminance component.

Figure 8C:
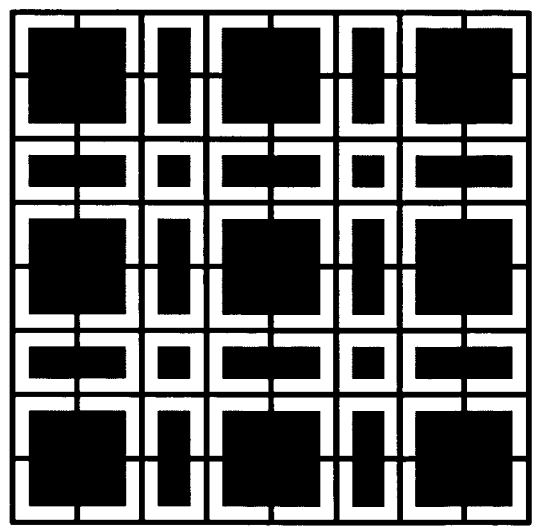

FIG. 8C shows a downscale by ⅝ for an 8×8 block. The 64 pixels in the 8×8 block are arranged into 25 boxes, e.g., as shown in FIG. 8C. Each box contains 4, 2, or 1 pixel. The luminance values in each box are added and divided by the number of pixels in the box to obtain the average Y value for the box. Again, each chrominance component may first be upsampled and then added and divided in the same manner as for the luminance component.

In general, a downscale by M/L may be performed for an N×N block by arranging the N·N pixels in the N×N block into a proper number of boxes to achieve the downscale. Boxes of different sizes may be evenly distributed across the N×N block, to the extent possible, to reduce artifacts in the downscaled image. Chrominance values for neighboring N×N blocks may be fetched and used to compute the average Cr and Cb values for the downscaled image.

For an upscale (or upsampling) by two, a new pixel is interpolated between each pair of existing pixels in both the horizontal and vertical directions. An N×N block with N·N pixels may be upscaled by two to obtain a 2N×2N block with 4·N·N pixels, or four times the number of pixels as the original block. The interpolation may be performed in various manners. In an embodiment, bicubic interpolation is used for luminance, and bilinear interpolation is used for Cr and Cb components. To perform the bicubic and bilinear interpolation on all pixels in the N×N block, including the pixels located at the edges of the N×N block, a (N+2)×(N+2) block may be fetched from main memory 152.

Figure 9A:
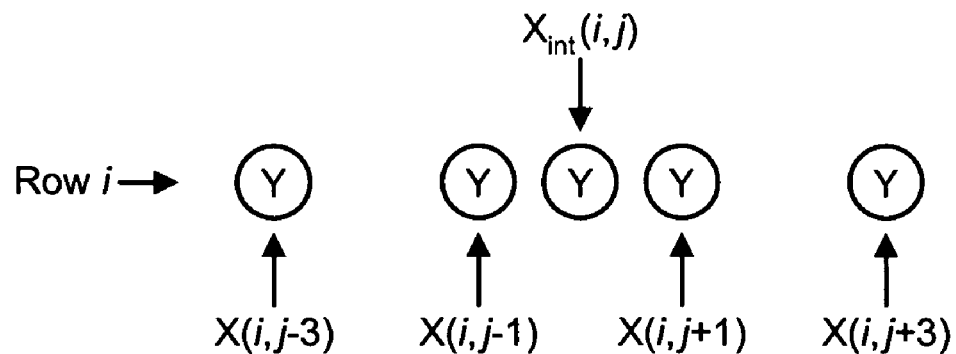
FIGS. 9A and 9B show bicubic interpolation for row and column, respectively.

FIG. 9A shows bicubic interpolation for an X value in a given row. An interpolated X value for row i may be expressed as:

$$X_{int}(i, j) = \frac{-X(i, j-3) + 9X(i, j-1) + 9X(i, j+1) - X(i, j+3)}{16}, \quad \text{Eq (4)}$$

where X(i,j−x) is an X value located x half-pixel positions to the left of X(i,j); and X(i,j+x) is an X value located x half-pixel positions to the right of X(i,j).

As shown in equation (4) and FIG. 9A, each interpolated X value in a row is determined by two X values to the left and two X values to the right of the interpolated X value in the same row.

Figure 9B:
Figure 9B:
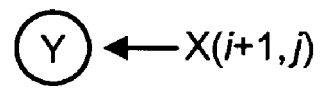
Figure 9B:
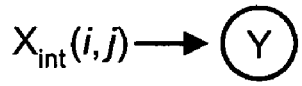
Figure 9B:
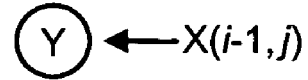
Figure 9B:
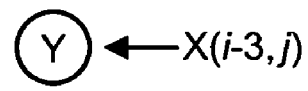

FIG. 9B shows bicubic interpolation for an X value in a given column. An interpolated X value for column j may be expressed as:

$$X_{int}(i, j) = \frac{-X(i-3, j) + 9X(i-1, j) + 9X(i+1, j) - X(i+3, j)}{16}, \quad \text{Eq (5)}$$

where $X_{int}(i,j)$ is the interpolated X value at pixel location (i,j);

X(i−x,j) is an X value located x half-pixel positions above X(i,j); and

X(i+x,j) is an X value located x half-pixel positions below X(i,j).

As shown in equation (5) and FIG. 9B, each interpolated X value in a column is determined by two X values above and two X values below the interpolated X value in the same column.

The upscaling for R, G, B, and Y in an N×N block may be performed by (1) interpolating each row of the block to obtain interpolated pixel values in the horizontal direction and (2) interpolating each column of the interpolated rows to obtain interpolated pixel values in the vertical direction. The upscaling for Cr and Cb may be performed by (1) upsampling chrominance to obtain a Cr value and a Cb value for each original pixel location and (2) copying the Cr and Cb values at each original pixel location to three interpolated pixel locations that are half-pixel to the right, half-pixel below, and half-pixel to the right and half-pixel below the original pixel location. The upscaling may also be performed in other manners. The result of the upscaling is a set of R, G, and B values or a set of Y, Cr, and Cb values for each pixel location in the upsampled block.

4. Graphics Functions

Display processor 140 may crop a block of pixel data, as necessary. An entire block may be retrieved for efficient memory access. However, only a portion of the block may be processed and provided to frame buffer 186. In this case, mix, blend, and crop unit 340 clips or cuts out the portions that do not need to be processed and retains the desired portion.

Display processor 140 may perform alpha-blend to combine two images to generate a single output image. Alpha-blend may be used to superimpose two images on top of one another, e.g., to place text over video or graphics, to show graphics over video, and so on. The alpha-blend may be performed for each component X as follows:

$$X_{out}(i,j) = \alpha \cdot X_1(i,j) + (1-\alpha) \cdot X_2(i,j), \quad \text{Eq. (6)}$$

where $X_1(i,j)$ is an X value from first buffer 336 for pixel location (i,j) in a block;

$X_2(i,j)$ is an X value from second buffer 338 for pixel location (i,j);

α is a coefficient that determines the weights for $X_1(i,j)$ and $X_2(i,j)$; and $X_{out}(i,j)$ is an output Y value for pixel location (i,j).

Typically, $0 \leq \alpha \leq 1$. A larger value of a gives more weight to $X_1(i,j)$, and a smaller value of a gives more weight to $X_2(i,j)$.

Mix, blend, and crop unit 340 may perform alpha-blend for each pixel location in the output image as shown in equation (6). Unit 340 scales and combines two X values in buffers 336 and 338 for the same pixel location and stores the resultant output X value in device buffer 342. Buffers 336 and 338 may store two blocks for the foreground and background, respectively, for alpha-blend. Alternatively, a single buffer may be used for alpha-blend. A scaled foreground block, $a \cdot X_1(i,j)$, may be stored in first buffer 336 when the foreground block is retrieved. A scaled background block, $(1-\alpha) \cdot X_2(i,j)$, may then be combined with the stored scaled foreground block when the background block is retrieved.

Display processor 140 may perform transparency to show only a background image, only a foreground image, or a combination of both the background and foreground images. Transparency may be used, e.g., to show an icon or text over a background image. Mix, blend, and crop unit 340 may perform transparency for each pixel location in the output image. Unit 340 retrieves a pixel value for a given pixel location (e.g., for a background image) from first buffer 336 and another pixel value for the same pixel location (e.g., for a foreground image) from second buffer 338. If the pixel value retrieved from second buffer 338 matches a transparency value, then unit 340 writes the pixel value from first buffer 336 to device buffer 342. Otherwise, unit 340 writes the pixel value from second buffer 338 to device buffer 342. Each pixel value in buffer 338 is composed of B bits (e.g., B=18) and falls within a range of 0 through $2^B-1$. One of the $2^B$ possible values may be reserved and used as the transparency value to indicate whether or not to display that pixel value. The transparency value is thus used as a mask or a "key". The same or different transparency values may be used for different blocks. Unit 340 is informed of the transparency value applicable to each block.

Display processor 140 may also perform transparency in combination with alpha-blend. For each pixel location, the pixel value from first buffer 336 is provided to device buffer 342 if the pixel value from second buffer 338 matches the transparency value. The alpha-blend of the two pixel values from buffers 336 and 338 is provided to device buffer 342 if the pixel value from second buffer 338 does not match the transparency value.

Text overlay is a special case of transparency. In text overlay, a pixel value in second buffer 338 is either a value for a set color or a transparency value. The pixel value from second buffer 338 is provided to device buffer 342 if it is equal to the set color and the corresponding pixel value from first buffer 336 is provided to device buffer 342 otherwise.

Display processor 140 may perform font expansion to convert a one bit per pixel (bbp) value into multiple bits per pixel value. The one bpp value may be used to efficiently represent text. The multiple bpp value may be, e.g., an 18-bit value that includes 6 bits for red, 6 bits for green, and 6 bits for blue. The multiple bpp value is either a font color set for text or a transparency value. The multiple bpp value may be written to second buffer 338.

The combination of the font expansion and transparency allows display processor 140 to examine each 1-bpp value from first buffer 336 and then write either the corresponding pixel value from second buffer 338 or a selected font color to device buffer 342.

For clarity, a specific embodiment of display processor 140 designed to perform a specific set of functions has been described above. A specific design of display processor 140 has also been described and shown in FIG. 3. In general, a display processor may perform any number of functions and any function that can facilitate the transfer of image data to the frame buffer. The display processor may thus be designed with fewer, more, and/or different processing units than those shown in FIG. 3.

Display processor 140 can provide various advantages. A common display processor 140 can efficiently serve multiple processors that provide video, graphics, text, and so on for the LCD screen. This can reduce the amount of redundant circuitry. Display processor 140 can relieve these processors from having to perform post-processing tasks, which may then allow these processors to concentrate on their own specialized tasks. Display processor 140 can write image data to LCD unit 180 for these processors. Since the LCD unit is normally slow, these processors may waste many clock cycles waiting for the LCD unit to accept the image data. Display processor 140 can write image data efficiently to the LCD unit, as described above.

Display processor 140 can perform post-processing tasks on an image (e.g., flip, rotate, color conversion, rescale, and so on) on-the-fly prior to transferring the image to frame buffer 186. This avoids situations whereby a processor performs post-processing on images that are subsequently discarded and not displayed on the LCD screen. For example, frames may be retrieved out of order for an MPEG video, and post-processing may be skipped for frames that will not be displayed for various reasons, e.g., because the video has lagged the audio.

Display processor 140 can perform the post-processing tasks in an efficient manner. For example, other processors may ordinarily require multiple accesses of main memory 152 to perform some of the post-processing tasks (e.g., overlay). In contrast, display processor 140 may be able to perform these tasks with fewer (e.g., one) memory accesses. Display processor 140 can read image data in its native format and process frames that will be displayed. Display processor 140 also operates on blocks of data, which may be much more efficient for memory access and some operations such as 90° rotation. Display processor 140 can efficiently provide output image data by lines and in the output format expected by LCD unit 180. Display processor 140 may inform LCD controller 182 that an entire frame of image data is being written to frame buffer 186 in order to reduce overhead associated with writing to the frame buffer. Display processor 140 may then retrieve input image data, perform post-processing on the fly, and provide output image data to frame buffer 186 in the format expected by LCD controller and without causing tearing.

The display processor described herein may be implemented by various means. For example, the display processor may be implemented in one or more ASICs, DSPs, digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

The functions supported by the display processor may also be implemented with hardware, software, or a combination of both. For example, the various processing units shown in FIG. 3 may be implemented with dedicated hardware. Alternatively, one or more of these processing units may be implemented with software modules (e.g., procedures, functions, and so on) that perform the functions described herein. The software codes may be stored in a memory unit (e.g., memory unit 322 in FIG. 3) and executed by a processor (e.g., instruction processor 320).

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit for a wireless device, the integrated circuit comprising:
a display processor;
a first external bus interface unit that couples the display processor to a first bus that is external to the display processor, wherein the first external bus interface is configured to receive input image data and provide the input image data to the display processor;
one or more additional processors;
a second external bus interface unit that is configured to provide output image data for presentation on an electronic screen; and
a synchronization unit configured to track a write pointer and a read pointer for a frame buffer associated with the electronic screen and ensure that the write pointer lags the read pointer,
wherein the display processor includes at least one processing unit configured to perform at least one post-processing function on the input image data to obtain the output image data and a device buffer configured to store the output image data, wherein the device buffer acts like a virtual buffer and stores one or more rows of data blocks that comprise less than one complete frame of the output image data for the electronic screen,
wherein the device buffer is updated at different update rates for different regions associated with the electronic screen, wherein a refresh rate of the electronic screen is greater than one or more of the update rates to the frame buffer associated with the electronic screen for the different regions, wherein the different regions are associated with different data sources, and wherein the different regions include a video graphics region that displays video graphics and at least one status region that indicates a status of the wireless device, and
wherein the display processor is configured to provide the output image data in a line by line format from the device buffer to the frame buffer associated with the electronic screen, which is used to store a frame of the output image data for presentation on the electronic screen, wherein one or more of the data blocks stored in the device buffer are stored in non-contiguous locations within the device buffer, and wherein lines associated with one of the rows of data blocks are retrieved from the device buffer and written to the frame buffer using the second external bus interface while new data blocks for another row arrive via the first external bus interface.

2. The integrated circuit of claim 1, wherein the at least one processing unit is configured to process the input image data in blocks, and wherein the second external bus interface unit is configured to provide the output image data in lines.

3. The integrated circuit of claim 1, wherein the at least one processing unit is configured to perform region flip, region rotation, color conversion, image size rescaling, alpha-blending, transparency, text overlay, or a combination thereof.

4. The integrated circuit of claim 1, further comprising:
an instruction processor configured to receive instructions in a list, execute the instructions in the list until a termination condition is encountered, and direct the at least one processing unit to process the input image data in accordance with the instructions.

5. The integrated circuit of claim 1, wherein the synchronization unit is configured to receive a vertical synchronization signal indicating each refresh cycle for the electronic screen and to determine timing for providing the output image data from the second external bus interface unit to avoid causing visual artifacts on the electronic screen.

6. An apparatus comprising:
means for receiving input image data for an electronic screen;
means for performing at least one post-processing function on the input image data to obtain output image data, wherein the means for performing at least one post-processing function comprises a processing unit and a device buffer configured to store the output image data, wherein the device buffer acts like a virtual buffer and stores one or more rows of data blocks that comprise less than one complete frame of the output image data for the electronic screen;
means for providing the output image data in line by line format to a frame buffer associated with the electronic screen, wherein the frame buffer is used to store a frame of the output image data for presentation on the electronic screen, wherein one or more of the data blocks stored in the device buffer are stored in non-contiguous locations within the device buffer, and wherein lines associated with one of the rows of data blocks are retrieved from the device buffer and written to the frame buffer via an external bus interface while new data blocks for another row are retrieved via another external bus interface;
means for tracking a write pointer and a read pointer for the frame buffer associated with the electronic screen, wherein the means for tracking ensures that the write pointer lags the read pointer; and
means for updating the device buffer at different update rates for different regions associated with the electronic screen, wherein a refresh rate of the electronic screen is greater than one or more of the update rates to the frame buffer associated with the electronic screen for the different regions, wherein the different regions are associated with different data sources, and wherein the different regions include a video graphics region that displays video graphics and at least one status region that indicates a status of the apparatus.

7. The apparatus of claim 6, wherein the at least one post-processing function comprises region flip, region rotation, color conversion, image size resealing, alpha-blending, transparency, text overlay, or a combination thereof.

8. The apparatus of claim 6, further comprising:
means for receiving a vertical synchronization signal indicating each refresh cycle for the electronic screen; and
means for determining timing for providing the output image data, based on the vertical synchronization signal, to avoid causing visual artifacts on the electronic screen.

9. A wireless device comprising:
a display processor;
a first bus;
a first external bus interface unit that couples the display processor to the first bus that is external to the display processor, wherein the first external bus interface is configured to receive input image data via the first bus and provide the input image data to the display processor;
one or more additional processors;
a second bus;
a second external bus interface unit configured to provide output image data from the display processor via the second bus in a line by line format to a frame buffer of an electronic screen unit, wherein the frame buffer is used to store a frame of the output image data for presentation on an electronic screen; and a synchronization unit configured to track a write pointer and a read pointer for the frame buffer associated with the electronic screen and ensure that the write pointer lags the read pointer, wherein the display processor includes at least one processing unit configured to perform at least one post-processing function on the input image data to obtain the output image data, and a device buffer configured to store the output image data, wherein the device buffer acts like a virtual buffer and stores one or more rows of data blocks that comprise less than one complete frame of the output image data for the electronic screen, wherein the device buffer is updated at different update rates for different regions associated with the electronic screen, wherein a refresh rate of the electronic screen is greater than one or more of the update rates to the frame buffer associated with the electronic screen for the different regions, wherein the different regions are associated with different data sources, and wherein the different regions include a video graphics region that displays video graphics and at least one status region that indicates a status of the wireless device, and wherein one or more of the data blocks stored in the device buffer are stored in non-contiguous locations within the device buffer, and wherein lines associated with one of the rows of data blocks are retrieved from the device buffer and written to the frame buffer using the second external bus interface while new data blocks for another row arrive via the first external bus interface.

10. The wireless device of claim 9, wherein the display processor includes at least one of:

a flip processor that provides flipping the input image left-to-right, up-and-down, or both left-to-right and up-and-down;

a rotate processor that rotates the input image in 90 degree increments;

a color, convert, and scale processor that upsamples for red and blue chrominance components of the input image data; and a mix, blend, and crop processor that alpha-blends the input image data.

11. A method comprising:

receiving input image data for an electronic screen;

performing at least one post-processing function on the input image data to obtain output image data, wherein the performing at least one post-processing function comprises a processing unit and a device buffer configured to store the output image data, wherein the device buffer acts like a virtual buffer and stores one or more rows of data blocks that comprise less than one complete frame of the output image data for the electronic screen;

providing the output image data in line by line format to a frame buffer associated with the electronic screen, wherein the frame buffer is used to store a frame of the output image data for presentation on the electronic screen, wherein one or more of the data blocks stored in the device buffer are stored in non-contiguous locations within the device buffer, and wherein lines associated with one of the rows of data blocks are retrieved from the device buffer and written to the frame buffer via an external bus interface while new data blocks for another row are retrieved via another external bus interface;

tracking a write pointer and a read pointer for the frame buffer associated with the electronic screen, wherein the tracking ensures that the write pointer lags the read pointer; and updating the device buffer at different update rates for different regions associated with the electronic screen, wherein a refresh rate of the electronic screen is greater than one or more of the update rates to the frame buffer associated with the electronic screen for the different regions, wherein the different regions are associated with different data sources, and wherein the different regions include a video graphics region that displays video graphics and at least one status region that indicates a status of an apparatus.

12. The method of claim 11, wherein the at least one post-processing function comprises region flip, region rotation, color conversion, image size rescaling, alpha-blending, transparency, text overlay, or a combination thereof.

13. The method of claim 11, further comprising:

receiving a vertical synchronization signal indicating each refresh cycle for the electronic screen; and determining timing for providing the output image data, based on the vertical synchronization signal, to avoid causing visual artifacts on the electronic screen.

\* \* \* \* \*

UNITED STATES PATENT AND TRADEMARK OFFICE
CERTIFICATE OF CORRECTION

| | | |
|---|---|---|
| PATENT NO. | : 7,868,890 B2 | Page 1 of 1 |
| APPLICATION NO. | : 10/954408 | |
| DATED | : January 11, 2011 | |
| INVENTOR(S) | : Ludwin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 415 days.

Signed and Sealed this
Twenty-sixth Day of July, 2011

David J. Kappos
*Director of the United States Patent and Trademark Office*